US009927986B2

(12) United States Patent
Hodes et al.

(10) Patent No.: US 9,927,986 B2
(45) Date of Patent: Mar. 27, 2018

(54) DATA STORAGE DEVICE WITH TEMPERATURE SENSOR AND TEMPERATURE CALIBRATION CIRCUITRY AND METHOD OF OPERATING SAME

(71) Applicant: SANDISK TECHNOLOGIES LLC, Plano, TX (US)

(72) Inventors: Avichay Hodes, Kfar Ben Nun (IL); Vered Kelner, Moshav Gan Haim (IL); Judah Gamliel Hahn, Ofra (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 84 days.

(21) Appl. No.: 15/054,613

(22) Filed: Feb. 26, 2016

(65) Prior Publication Data
US 2017/0249091 A1    Aug. 31, 2017

(51) Int. Cl.
G06F 3/06       (2006.01)
G06F 1/20       (2006.01)
G06F 1/32       (2006.01)

(52) U.S. Cl.
CPC ............ G06F 3/0611 (2013.01); G06F 1/206 (2013.01); G06F 1/3225 (2013.01); G06F 1/3296 (2013.01); G06F 3/0634 (2013.01); G06F 3/0679 (2013.01); Y02B 60/1285 (2013.01)

(58) Field of Classification Search
None
See application file for complete search history.

(56) References Cited

U.S. PATENT DOCUMENTS

| 9,703,336 | B2* | 7/2017 | Alton ................... G06F 1/206 |
| 2002/0143488 | A1 | 10/2002 | Cooper et al. |
| 2004/0059545 | A1 | 3/2004 | Sun |
| 2004/0215371 | A1 | 10/2004 | Samson et al. |
| 2004/0215912 | A1 | 10/2004 | Vergis et al. |
| 2004/0267409 | A1 | 12/2004 | De Lorenzo et al. |
| 2008/0103634 | A1 | 5/2008 | Santos et al. |
| 2012/0230711 | A1* | 9/2012 | Shiori .................... G03G 21/20 399/44 |
| 2013/0076381 | A1* | 3/2013 | Takayanagi ............ G01K 3/005 324/750.03 |
| 2014/0103125 | A1 | 4/2014 | Wyatt |

(Continued)

FOREIGN PATENT DOCUMENTS

| EP | 2560073 A1 | 2/2013 |
| EP | 2573531 A2 | 3/2013 |

OTHER PUBLICATIONS

PCT International Application No. PCT/US2017/016423 International Search Report and Written Opinion dated Jul. 21, 2017.

*Primary Examiner* — Kevin Verbrugge
(74) *Attorney, Agent, or Firm* — Kunzler, PC

(57) ABSTRACT

A data storage device includes a non-volatile memory, a temperature sensor, and temperature calibration circuitry coupled to the temperature sensor. The temperature calibration circuitry is configured to cause memory operations to be performed on storage elements of the non-volatile memory, to determine a temperature metric based on temperature readings from the temperature sensor in response to initiation of the memory operations, and to modify a temperature threshold based on the temperature metric.

25 Claims, 5 Drawing Sheets

(56) References Cited

U.S. PATENT DOCUMENTS

2014/0163814 A1    6/2014  Rousu et al.
2014/0236380 A1*   8/2014  Alton .................... G06F 1/206
                                                    700/299
2017/0160707 A1*   6/2017  Srinivasan ............ G05B 15/02

* cited by examiner

DATA STORAGE DEVICE WITH TEMPERATURE SENSOR AND TEMPERATURE CALIBRATION CIRCUITRY AND METHOD OF OPERATING SAME

FIELD OF THE DISCLOSURE

This disclosure is generally related to data storage devices and more particularly to temperature sensing and calibration for a data storage device.

BACKGROUND

Storage devices enable users to store and retrieve data. Examples of storage devices include volatile memory devices and non-volatile memory devices. A non-volatile memory may retain data after a power-down event, and a volatile memory may lose data after a power-down event.

During operation, a storage device generates heat and consumes power. The amount of heat generated by a storage device may depend on a particular implementation platform. For example, a storage device may generate more heat in one platform as compared to another platform, such as due to an amount of ventilation. Because different platforms may result in different heat dissipation, a storage device may be configured to operate based on a "worst case" operating scenario. As a result, performance of the storage device may be reduced more than necessary for certain platforms.

DETAILED DESCRIPTION

A data storage device in accordance with the disclosure includes a non-volatile memory, a temperature sensor, and a temperature calibration engine. The temperature calibration engine may calibrate operation of the data storage device using temperature data from the temperature sensor. For example, the temperature calibration engine may use temperature data from the temperature sensor may to determine a temperature metric for a particular operating environment (e.g., platform) of the data storage device. The temperature metric may indicate a rate of temperature increase and a range of temperatures detected at the data storage device during operation of the data storage device.

The temperature calibration engine may be configured to determine one or more thresholds based on the temperature metric, such as a lower threshold and an upper threshold. In an illustrative example, the temperature calibration engine may reduce memory access throughput in response to detecting that a temperature of the data storage device satisfies the lower threshold, and the temperature calibration engine may further reduce memory access throughput in response to detecting that a temperature of the data storage device satisfies the upper threshold.

The temperature calibration engine may recalibrate the lower threshold and the upper threshold. For example, the temperature calibration engine may perform recalibration in response to detecting a trigger event (e.g., at a specified operational point), such as in response to detecting that a host device is coupled to the data storage device, detecting a power-up event at the data storage device, or detecting that a particular time interval (e.g., a time interval 160) has elapsed since a previous temperature calibration process. In some cases, recalibration may enable the data storage device to increase a threshold, such as if ventilation has increased or ambient temperature has decreased. Accordingly, performance of the data storage device may be improved as compared to a device that uses a "worst case" scenario for temperature calibration.

Particular aspects of the disclosure are described below with reference to the drawings. In the description, common or similar features may be designated by common reference numbers. As used herein, "exemplary" may indicate an example, an implementation, and/or an aspect, and should not be construed as limiting or as indicating a preference or a preferred implementation.

Figure 1:
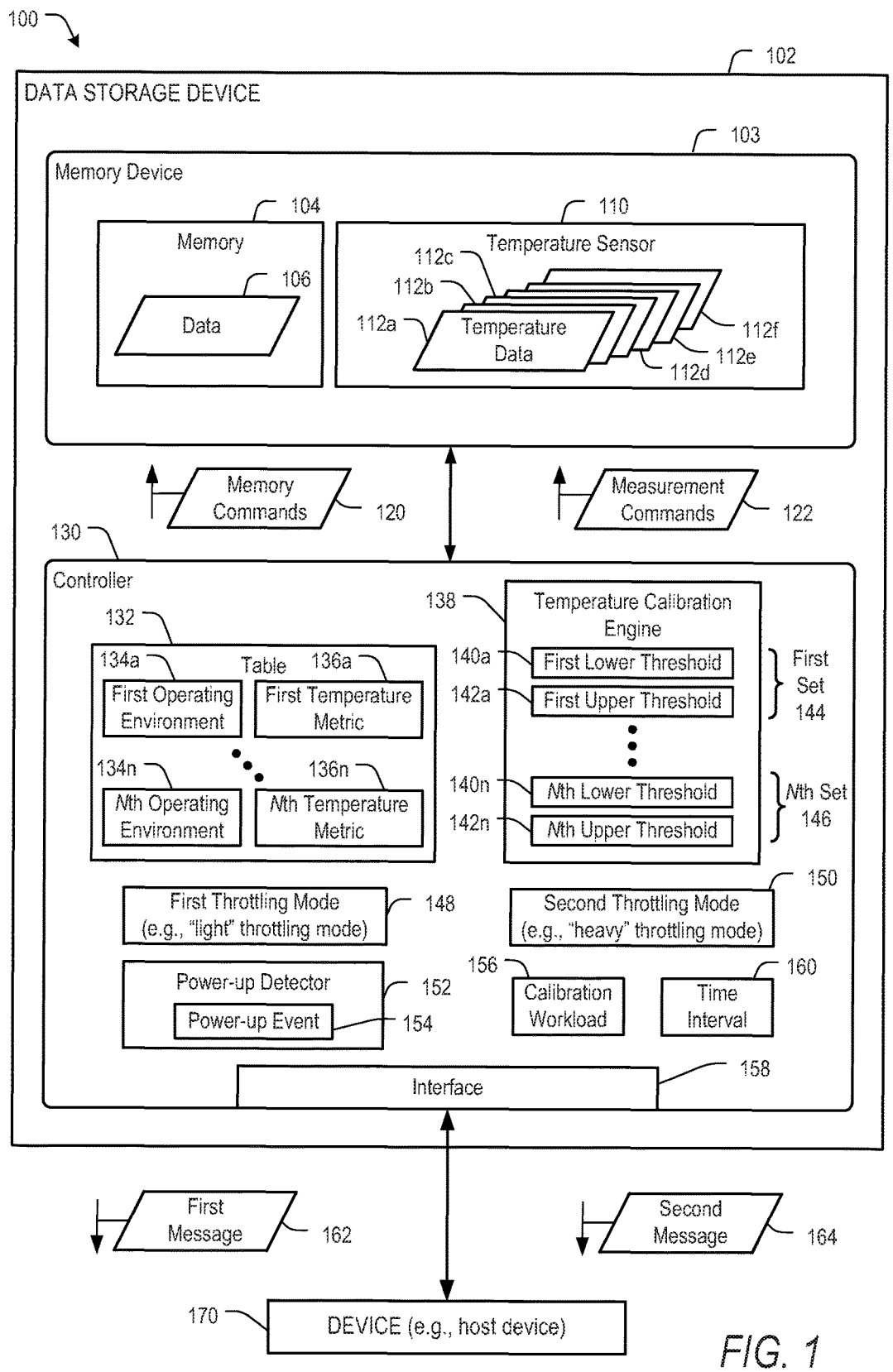
FIG. 1 is a diagram of a particular illustrative example of a system including a data storage device that includes a temperature sensor and a temperature calibration engine.

Referring to FIG. 1, a particular illustrative example of system is depicted and generally designated 100. The system 100 includes a data storage device 102 (e.g., an apparatus) and a device 170 (e.g., a host device or an access device). The data storage device 102 includes a memory device 103 and a controller 130. The controller 130 is coupled to the memory device 103. In some implementations, the data storage device 102 is integrated within the device 170, such as in connection with a solid-state drive (SSD) implementation. The data storage device 102 includes a temperature sensor 110 and a temperature calibration engine 138 configured to initiate temperature calibration processes based on temperature readings from the temperature sensor 110.

The memory device 103 includes a memory 104, such as a non-volatile array of storage elements included in one or more memory dies. The memory 104 may include a flash memory (e.g., a NAND flash memory) or a resistive memory, such as a resistive random access memory (ReRAM), as illustrative examples. The memory 104 may have a three-dimensional (3D) memory configuration. As used herein, a 3D memory device may include multiple physical levels of storage elements (instead of having a single physical level of storage elements, as in a planar memory device). As an example, the memory 104 may have a 3D vertical bit line (VBL) configuration. In a particular implementation, the memory 104 is a non-volatile memory having a 3D memory array configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory 104 includes one or more regions of storage elements. An example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the memory 104 may be programmable to a state (e.g., a threshold voltage in a flash configuration or a resistive state in a resistive memory configuration) that indicates one or more values. As an example, in an illustrative TLC scheme, a storage element may be programmable to a state that indicates three values. As an additional example, in an illustrative MLC scheme, a storage element may be programmable to a state that indicates two values.

The data storage device 102 further includes the temperature sensor 110. The example of FIG. 1 illustrates that the memory device 103 may include the temperature sensor 110. Alternatively or in addition, the controller 130 may include a temperature sensor corresponding to the temperature sensor 110. The temperature sensor 110 may be coupled to or may be in thermal communication with the controller 130. For example, the temperature sensor 110 may be configured to receive commands from the controller 130, to provide temperature readings to the controller 130, to perform one or more other operations, or a combination thereof.

The controller 130 includes the temperature calibration engine 138 (e.g., temperature calibration circuitry that is coupled to the temperature sensor 110). The controller 130 may store a table 132 and may include a power-up detector 152 and an interface 158 (e.g., a host interface).

During operation, the data storage device 102 may perform one or more temperature calibration processes. During a temperature calibration process, the temperature calibration engine 138 may receive temperature data (e.g., temperature readings indicating one or more temperatures detected at the memory device 103) from the temperature sensor 110. Based on the temperature data, the temperature calibration engine 138 may determine one or more thresholds for "throttling" operation of the data storage device 102 in order to increase a rate at which heat is dissipated (or "shed") at the data storage device 102 (e.g., to avoid damage to components of the data storage device 102). For example, a threshold may indicate a temperature of the memory device 103 at which the temperature calibration engine 138 reduces a frequency of operations at the data storage device 102, reduces power consumption by the data storage device 102, performs one or more other operations, or a combination thereof.

The data storage device 102 may perform temperature calibration processes in multiple environments. To illustrate, the data storage device 102 may perform a first temperature calibration process after fabrication of the data storage device 102 (e.g., "at the factory"), in response to a power-up (e.g., an initial power-up) of the data storage device 102, or during an assembly process associated with another electronic device (e.g., an assembly process to integrate the data storage device 102 within the device 170). Alternatively or in addition, the data storage device 102 may perform the first temperature calibration process during an initialization process associated with another electronic device (e.g., an initialization process associated with the device 170), in response to detecting communication from the device 170 at the interface 158, or during an end user mode of operation.

In an illustrative example, the temperature calibration engine 138 is configured to cause memory operations to be performed on storage elements of the memory 104 (e.g., by sending one or more memory commands 120 to the memory device 103). The memory operations may include writing data 106 to the memory 104, reading the data 106 from the memory 104, erasing the data 106 from the memory 104, or a combination thereof. The memory operations may be performed during a temperature calibration process to enable measurement (e.g., using the temperature sensor 110) of temperature response and heat dissipation rates associated with the memory device 103. The temperature calibration engine 138 may be further configured to determine a first temperature metric 136a based on temperature readings generated by the temperature sensor 110 in response to initiation of the memory operations. For example, the temperature readings may include temperature data 112a generated by the temperature sensor 110 and provided to the temperature calibration engine 138.

The first temperature metric 136a may indicate a temperature rise detected at the memory 104 by the temperature sensor 110 during execution of the memory operations. To further illustrate, the first temperature metric 136a may indicate multiple temperatures indicated by the temperature data 112a as a function of time (e.g., over a particular operation interval of the data storage device 102) or as a function of a number of operations performed at the data storage device 102, as illustrative examples. The first temperature metric 136a may indicate a "minimum" detected or estimated temperature of the memory device 103 indicated by the temperature data 112a and a "maximum" detected or estimated temperature of the memory device indicated by the temperature data 112a.

The temperature calibration engine 138 may be configured to send one or more measurement commands 122 to the temperature sensor 110 to cause the temperature sensor 110 to generate the temperature data 112a. The temperature calibration engine 138 may be configured to send the one or more measurement commands 122 to the temperature sensor 110 in response to detecting a trigger event. To illustrate, the trigger event may include one or more of detecting a host device coupled to the data storage device 102 (e.g., detecting that the device 170 is coupled to the data storage device 102, such as in response to a communication from the device 170), detecting a power-up event 154 at the data storage device 102 (e.g., using the power-up detector 152), or detecting that the data storage device 102 has not previously determined a temperature metric and a temperature threshold (e.g., by determining that the table 132 is empty).

The temperature calibration engine 138 may be configured to modify one or more temperature thresholds associated with the data storage device 102 based on the first temperature metric 136a. As used herein, a "temperature threshold" may be associated with the data storage device 102 or with one or more components of the data storage device 102, such as the memory device 103, the memory 104, the controller 130, or a combination thereof.

The temperature calibration engine 138 may be configured to set a first temperature threshold (e.g., a first lower threshold 140a) based on the temperature metric 136a, a second temperature threshold (e.g., a first upper threshold 142a) based on the temperature metric 136a, or both. For example, the first lower threshold 140a may correspond to a first percentage (e.g., 80 percent, as an illustrative, non-limiting example) of the "maximum" temperature indicated by the first temperature metric 136a. As another example, the first upper threshold 142a may correspond to a second percentage (e.g., 90 percent, as an illustrative, non-limiting example) of the "maximum" temperature indicated by the first temperature metric 136a. The first lower threshold 140a and the first upper threshold 142a may be included in a first set 144 of temperature thresholds.

The first temperature metric 136a and the first set 144 may be determined in a first operating environment 134a. To illustrate, the first operating environment 134a may correspond to one of a production stage of the data storage device 102 (e.g., a stage of a manufacturing process to manufacture the data storage device 102), a production stage of a host device (e.g., the device 170) that includes the data storage device 102 (e.g., a stage of a manufacturing process to manufacture the device 170), an initialization stage of the host device (e.g., a first power-up of the device 170), or an end user stage of the data storage device 102 (e.g., during a user mode of operation), as illustrative examples.

The temperature calibration engine 138 may set one or more operating parameters based on the first temperature metric 136a. The one or more operating parameters may be used during "normal" (or non-throttling) operation of the data storage device 102. For example, the temperature calibration engine 138 may set a number of dies of the memory device 103 that may be accessed in parallel. To illustrate, if the first temperature metric 136a indicates that the memory device 103 dissipates heat relatively quickly in the first operating environment 134a, then the number of dies may be greater as compared to an operating environment in which the memory device 103 dissipates heat more slowly. Alternatively or in addition, the temperature calibration engine 138 may adjust a delay between input/output (I/O) operations performed at the interface 158. For example, the delay may be less if a rate of temperature rise indicated by the first temperature metric 136a is relatively low (e.g., as compared to a reference temperature metric that may be stored by the controller 130), and the delay may be greater if a rate of temperature rise indicated by the first temperature metric 136a is relatively high (e.g., as compared to the reference temperature metric).

After determining the first temperature metric 136a and the first set 144, the data storage device 102 may operate based on the first set 144. For example, during operation of the data storage device 102, the temperature calibration engine 138 may receive temperature readings from the temperature sensor 110, such as temperature data 112b. The temperature calibration engine 138 may receive temperature data (e.g., the temperature data 112b) from the temperature sensor 110 periodically, in response to sending one or more measurement commands 122, or in response to a power-up of the data storage device 102, as illustrative examples.

The temperature calibration engine 138 may be configured to compare one or more values (e.g., one or more detected or estimated temperatures) indicated by the temperature data 112b to the first lower threshold 140a, the first upper threshold 142a, or both. For example, the temperature calibration engine 138 may include a comparator circuit configured to compare temperature data (e.g., the temperature data 112b) to one or more thresholds (e.g., the first lower threshold 140a, the first upper threshold 142a, or both).

The temperature calibration engine 138 may initiate a first throttling mode 148 in response to detecting that a temperature indicated by the temperature data 112b satisfies (e.g., is greater than or equal to) the first lower threshold 140a. For example, the first throttling mode 148 may correspond to a "light throttling" mode of operation. Initiating the first throttling mode 148 may include reducing a data throughput (e.g., by slowing a rate of memory access operations to the memory 104 to enable heat dissipation at the memory device 103 by slowing the rate of the memory access operations).

The temperature calibration engine 138 may be further configured to initiate a second throttling mode 150, such as a "heavy throttling" mode of operation. For example, during operation based on the first throttling mode 148, the temperature calibration engine 138 may receive temperature data 112c from the temperature sensor 110, and the temperature calibration engine 138 may initiate the second throttling mode 150 in response to a temperature indicated by the temperature data 112c satisfying the first upper threshold 142a. As another example, the temperature calibration engine 138 may initiate the second throttling mode 150 in response to a temperature indicated by the temperature data 112b satisfying the first upper threshold 142a (e.g., the temperature calibration engine 138 may "skip" the first throttling mode 148). Initiating the second throttling mode 150 may include further reducing a data throughput (e.g., by slowing a rate of memory access operations to the memory 104 to enable heat dissipation at the memory device 103 by slowing the rate of the memory access operations).

In an illustrative implementation, the first lower threshold 140a and the first throttling mode 148 correspond to "light throttling," and the first upper threshold 142a and the second throttling mode 150 correspond to a "heavy throttling." For example, the first throttling mode 148 may be initiated to enable the data storage device 102 to maintain (or approximately maintain) a temperature in response to a temperature satisfying the first lower threshold 140a. As another example, the second throttling mode 150 may be initiated to enable the data storage device 102 to reduce temperature in response to a temperature satisfying the first upper threshold 142a.

The temperature calibration engine 138 may "step down" the mode of operation of the data storage device 102, such as from the second throttling mode 150 to the first throttling mode 148 or from the first throttling mode 148 to a default (non-throttling) mode. For example, the temperature calibration engine 138 may step down the mode of operation from the second throttling mode 150 to the first throttling mode 148 based on a temperature indicated by temperature data from the temperature sensor 110 failing to satisfy (e.g., being less than) the first upper threshold 142a (or another threshold). As another example, the temperature calibration engine 138 may step down the mode of operation from the first throttling mode 148 to the default mode based on a temperature indicated by temperature data from the temperature sensor 110 failing to satisfy the first lower threshold 140a (or another threshold).

The data storage device 102 may perform a second temperature calibration process to recalibrate one or more temperature thresholds based on an nth operating environment 134n (e.g., a second operating environment) of the data storage device 102, where n indicates a positive integer greater than one. For example, the nth operating environment 134n may correspond to another of the production stage of the data storage device 102, the production stage of the host device, the initialization stage of the host device, or the end user stage of the data storage device 102. In some implementations, a new or subsequent stage may be directly indicated to the temperature calibration engine 138, such as if a message is sent (e.g., by the device 170) to the temperature calibration engine 138 indicating that recalibration is to be performed. Alternatively or in addition, a new or subsequent stage may be "inferred" by the data storage device 102 in response to detecting a trigger event, such as one or more trigger events described above.

The temperature calibration engine 138 may receive temperature readings, such as temperature data 112d, from the temperature sensor 110 in connection with the second temperature calibration process. For example, the temperature calibration engine 138 may send the one or more measurement commands 122 to the temperature sensor 110 (e.g., to cause the temperature sensor 110 to generate the temperature data 112d). The temperature calibration engine 138 may send the one or more measurement commands 122 and may re-initiate execution of the memory operations (e.g., by sending the one or more memory commands 120) in response to detecting a trigger event, such as in response to detecting a host device (e.g., the device 170) coupled to the data storage device 102, detecting the power-up event 154 at the data storage device 102, or detecting that a particular time interval (e.g., the time interval 160) has elapsed since determination of the thresholds 140a, 142a.

The memory device 103 may perform one or more memory operations during the second temperature calibration process. For example, the controller 130 may send the one or more memory commands 120 to the memory device 103 to cause the memory device 103 to perform one or more memory operations in connection with the second temperature calibration process. The one or more memory operations may include one or more write operations to write the data 106, one or more read operations to read the data 106, one or more erase operations to erase the data 106, or a combination thereof, as illustrative examples. As a particular illustrative example, the one or more memory operations may include multiple memory operations (e.g., one thousand write operations or one thousand read operations), and a temperature at the memory device 103 may be measured using the temperature sensor 110 after performing the multiple memory operations.

The controller 130 may determine an nth temperature metric 136n associated with the nth operating environment 134n. For example, the nth temperature metric 136n may indicate a temperature rise detected at the memory 104 by the temperature sensor 110 during execution of the memory operations in the nth operating environment 134n. The nth temperature metric 136n may indicate a temperature rise detected at the memory 104 by the temperature sensor 110 during execution of the memory operations. To further illustrate, the nth temperature metric 136n may indicate temperatures indicated by the temperature data 112d as a function of time (e.g., over a particular operation interval of the data storage device 102) or as a function of a number of operations performed at the data storage device 102, as illustrative examples. The nth temperature metric 136n may indicate a "minimum" temperature of the memory device 103 indicated by the temperature data 112d and a "maximum" temperature of the memory device indicated by the temperature data 112d.

The controller 130 may determine an nth set 146 of temperature thresholds based on the nth temperature metric 136n. The nth set 146 of temperature thresholds may include an nth lower threshold 140n based on the nth temperature metric 136n and an nth upper threshold 142n based on the nth temperature metric 136n. For example, the nth lower threshold 140n may correspond to a first percentage (e.g., 80 percent, as an illustrative, non-limiting example) of the "maximum" temperature indicated by the nth temperature metric 136n. As another example, the nth upper threshold 142n may correspond to a second percentage (e.g., 90 percent, as an illustrative, non-limiting example) of the "maximum" temperature indicated by the nth temperature metric 136n.

The temperature calibration engine 138 may set one or more operating parameters based on the nth temperature metric 136n. The one or more operating parameters may be used during "normal" (or non-throttling) operation of the data storage device 102. For example, the temperature calibration engine 138 may set a number of dies of the memory device 103 that may be accessed in parallel. To illustrate, if the nth temperature metric 136n indicates that the memory device 103 dissipates heat more quickly in the nth operating environment 134n as compared to the first operating environment 134a, then the temperature calibration engine 138 may increase the number of memory dies of the memory device 103 that may be accessed in parallel. Alternatively or in addition, the temperature calibration engine 138 may adjust a delay between I/O operations performed at the interface 158. For example, the delay may be less if a rate of temperature rise indicated by the nth temperature metric 136n is relatively low (e.g., as compared to a reference temperature metric that may be stored by the controller 130), and the delay may be greater if a rate of temperature rise indicated by the nth temperature metric 136n is relatively high (e.g., as compared to the reference temperature metric).

After determining the nth set 146 of temperature thresholds, the data storage device 102 may be configured to initiate the first throttling mode 148 in response to detecting that a temperature satisfies the nth lower threshold 140n and to initiate the second throttling mode 150 in response to detecting that a temperature satisfies the nth upper threshold 142n. For example, the temperature calibration engine 138 may be configured to initiate the first throttling mode 148 in response to temperature data 112e indicating that a temperature of the memory device 103 satisfies the nth lower threshold 140n. As another example, the temperature calibration engine 138 may be configured to initiate the second throttling mode 150 in response to temperature data 112f indicating that a temperature of the memory device 103 satisfies the nth upper threshold 142n.

The temperature calibration engine 138 may be configured to provide a first message 162 to the device 170 in response to initiation of the first throttling mode 148 (e.g., in response to detecting that a temperature satisfies the first lower threshold 140a or the nth lower threshold 140n). The first message 162 may indicate that the data storage device 102 has initiated or is to initiate the first throttling mode 148. The temperature calibration engine 138 may be configured to provide a second message 164 to the device 170 in response to initiation of the second throttling mode 150 (e.g., in response to detecting that a temperature satisfies the first upper threshold 142a or the nth upper threshold 142n). The second message 164 may indicate that the data storage device 102 has initiated or is to initiate the second throttling mode 150.

The temperature calibration engine 138 may be configured to determine one or more temperature thresholds (e.g., one or more of the thresholds 140a, 140n, 142a, or 140n) based on a workload process indicated by a workload 156. For example, in response to initiating a temperature calibration process, the temperature calibration engine 138 may send the one or more memory commands 120 to the memory device 103, and the one or more memory commands 120 may comply with the workload 156. The workload 156 may indicate memory access operations that are selected to generate heat at the memory device 103.

As an illustrative example, the memory access operations may include sequential write operations to sequential physical addresses of the memory 104. In some implementations, the sequential write operations may concentrate heat in a particular area of the memory 104 as a result of applying programming pulses to adjacent word lines of the memory 104, as an illustrative example. The memory access operations may include performing parallel memory access operations to multiple memory dies (e.g., to a "maximum" number of memory dies that may be accessed in parallel).

The temperature calibration engine 138 may be configured to cause memory operations to be performed during a temperature calibration process based on detecting that a host interface (e.g., the interface 158) is coupled to a host device (e.g., the device 170). For example, the temperature calibration engine 138 may be configured to detect that the interface 158 is coupled to the device 170 upon receiving a message from the device 170 via the interface 158. Alternatively or in addition, the temperature calibration engine 138 may be configured to cause memory operations to be performed during a temperature calibration process in response to detection of the power-up event 154 by the power-up detector 152. Alternatively or in addition, the temperature calibration engine 138 may be configured to re-initiate the memory operations during a time interval that is associated with thermal calibration (e.g., the temperature calibration engine 138 may re-initiate a temperature calibration process in response to expiration of a time interval that is associated with thermal calibration, such as the time interval 160).

The controller 130 may be configured to store temperature information at the data storage device 102. For example, the data storage device 102 may store an indication of the first operating environment 134a, an indication of the first temperature metric 136a, and an indication of the first set 144 (e.g., in the table 132). Alternatively or in addition, the data storage device 102 may store an indication of the nth operating environment 134n, an indication of the nth temperature metric 136n, and an indication of the nth set 146 (e.g., in the table 132). In some implementations, the controller 130 may overwrite one or more temperature threshold indications with one or more subsequent temperature threshold indications. For example, the temperature calibration engine 138 may overwrite an indication of the first lower threshold 140a with an indication of the nth lower threshold 140n, an indication of the first upper threshold 142a with an indication of the nth upper threshold 142n, or both. In other implementations, the controller 130 may store indications of multiple lower thresholds, multiple upper thresholds, or both (e.g., instead of overwriting the indications).

The example of FIG. 1 may improve device operation by increasing accuracy of temperature calibration. For example, instead of calibrating the data storage device 102 for a "worst case" scenario, temperature calibration may be performed dynamically (e.g., in connection with a particular operating environment) (or multiple operating environments), resulting in more accurate temperature calibration.

Figure 2:
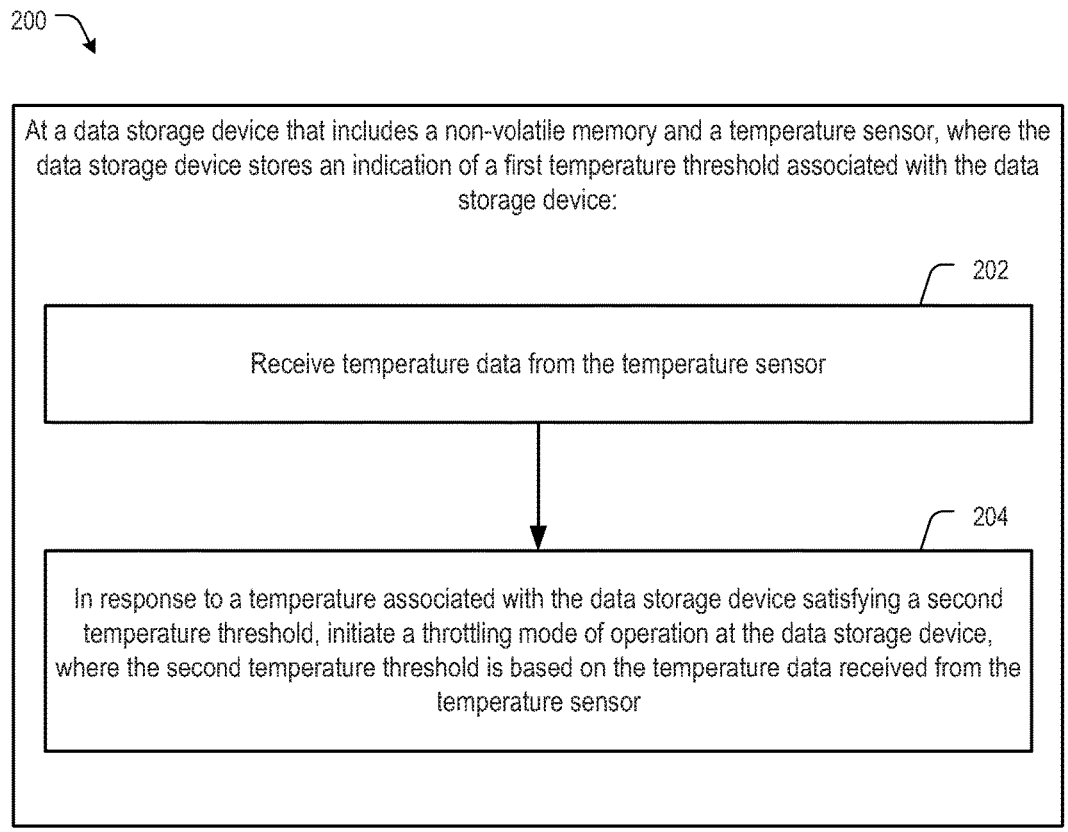
FIG. 2 is a flow chart of a particular illustrative embodiment of a method of operation of a data storage device, such as the data storage device of FIG. 1.

Referring to FIG. 2, an illustrative example of a method is depicted and generally designated 200. The method 200 may be performed at a data storage device (e.g., the data storage device 102) that includes a non-volatile memory (e.g., the memory 104) and a temperature sensor (e.g., the temperature sensor 110). The data storage device may store an indication of a first temperature threshold. For example, the data storage device may store an indication of the first lower threshold 140a or the first upper threshold 142a (e.g., in the table 132, as an illustrative example).

The method 200 includes receiving temperature data from the temperature sensor, at 202. As an illustrative example, the temperature calibration engine 138 may receive any of the temperature data 112a-f from the temperature sensor 110.

The method 200 further includes initiating, in response to a temperature measurement associated with the data storage device satisfying a second temperature threshold, a throttling mode of operation at the data storage device, at 204. The second temperature threshold is based on the temperature data received from the temperature sensor. As an example, the second temperature threshold may correspond to the nth lower threshold 140n, and the throttling mode of operation may correspond to the first throttling mode 148. As another example, the second temperature threshold may correspond to the nth upper threshold 142n, and the throttling mode of operation may correspond to the second throttling mode 150.

In some implementations, the method 200 may be performed using one or more hardware devices of the data storage device 102 of FIG. 1. As a non-limiting example, the temperature calibration engine 138 may include a state machine (e.g., a counter, such as a multi-bit counter), a comparator, a control circuit, and a timing device, such as a phase-locked loop (PLL) device. The timing device may generate a clock signal used to send data and instructions from the controller 130 to the memory device 103 (and vice versa). In connection with the method 200 of FIG. 2, the comparator may be configured to determine that the temperature satisfies the second temperature threshold, and the temperature calibration engine 138 may be configured to update a value stored at the state machine to indicate initiation of the throttling mode of operation. Based on the value stored at the state machine, the control circuit may provide a control signal to the timing device to set a frequency of the clock signal of the timing device. For example, the control signal may decrease the frequency of the clock signal in response to initiation of the throttling mode (as indicated by the value of the state machine). Decreasing the frequency of the clock signal may reduce a rate at which data and instructions are sent to and received from the memory device 103 by the controller 130, thus introducing "delay" and reducing throughput in response to initiation of the throttling mode of operation. Alternatively or in addition, throttling may include one or more other operations. For example, a frequency of another clock signal may be adjusted, such as by adjusting a frequency of a clock signal that is "internal" to the controller 130.

Figure 3:
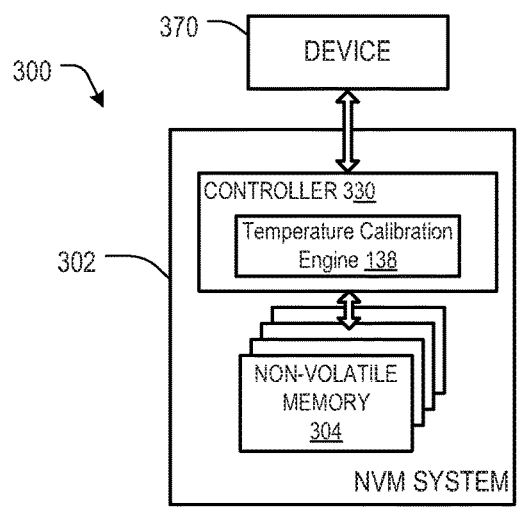
FIG. 3 is a block diagram of a particular illustrative embodiment of a non-volatile memory system that includes a data storage device, such as the data storage device of FIG. 1.

Referring to FIG. 3, a system 300 includes a non-volatile memory system 302 (e.g., the data storage device 102) that may be coupled to a device 370 (e.g., the device 170). The non-volatile memory system 302 includes a controller 330 (e.g., the controller 130) and non-volatile memory that may be made up of one or more non-volatile memory dies 304 (e.g., one or more memory dies included in the memory device 103). As used herein, the term "memory die" refers to the collection of non-volatile memory cells, and associated circuitry for managing the physical operation of those non-volatile memory cells, that are formed on a single semiconductor substrate. The controller 330 interfaces with the device 370 and transmits command sequences for read, program, and erase operations to the one or more non-volatile memory dies 304. The controller 330 includes the temperature calibration engine 138.

The controller 330 (which may be a flash memory controller) may take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 330 may be configured with hardware and/or firmware to perform the various functions described below and shown in the flow diagrams. Also, some of the components shown as being internal to the controller 330 can be stored external to the controller 330, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory, map out bad flash memory cells, and allocate spare cells to be substituted for future failed cells. Some part of the spare cells can be used to hold firmware to operate the flash memory controller and implement other features. In operation, when a host device is to read data from or write data to the flash memory, the host device communicates with the flash memory controller. If the host device provides a logical address to which data is to be read/written, the flash memory controller can convert the logical address received from the host device to a physical address in the flash memory. (Alternatively, the host device can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The one or more non-volatile memory dies 304 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between the controller 330 and the one or more non-volatile memory dies 304 may be any suitable flash interface, such as Toggle Mode 200, 400, or 800. In one embodiment, the non-volatile memory system 302 may be a card based system, such as a secure digital (SD) or a micro secure digital (micro-SD) card. In an alternate embodiment, the non-volatile memory system 302 may be part of an embedded memory system.

Although, in the example illustrated in FIG. 3, the non-volatile memory system 302 (sometimes referred to herein as a storage module) includes a single channel between the controller 330 and the one or more non-volatile memory dies 304, the subject matter described herein is not limited to having a single memory channel. For example, in some NAND memory system architectures (such as the ones shown in FIGS. 4 and 5), 2, 4, 8 or more NAND channels may exist between the controller 330 and the NAND memory device, depending on controller capabilities. In any of the embodiments described herein, more than a single channel may exist between the controller 330 and the one or more non-volatile memory dies 304, even if a single channel is shown in the drawings.

Figure 4:
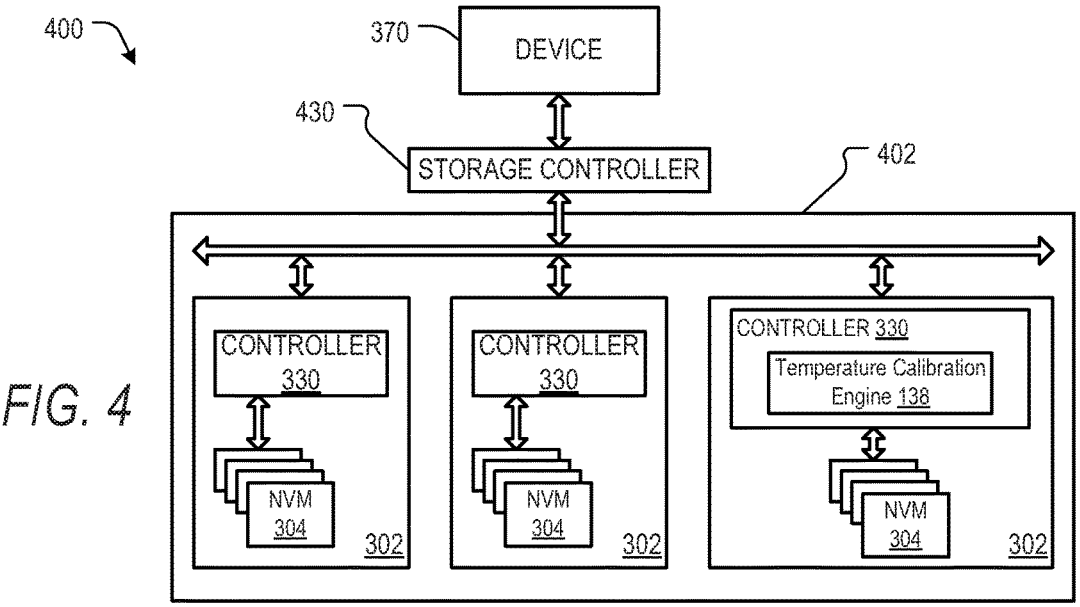
FIG. 4 is a block diagram of a particular illustrative embodiment of a storage system including a plurality of the non-volatile memory systems of FIG. 3.

FIG. 4 illustrates a storage system 400 that includes multiple non-volatile memory systems 302. As such, storage system 400 may include a storage controller 430 that interfaces with the device 370 (e.g., a host device) and with a storage system 402, which includes a plurality of non-volatile memory systems 302. The interface between the storage controller 430 and the non-volatile memory systems 302 may be a bus interface, such as a serial advanced technology attachment (SATA) or peripheral component interface express (PCIe) interface. The storage system 400 may correspond to a solid state drive (SSD), such as found in portable computing devices, such as laptop computers, and tablet computers. One or more of the controllers 330 of FIG. 4 may include the temperature calibration engine 138. The storage controller 430 may include the temperature calibration engine 138.

Figure 5:
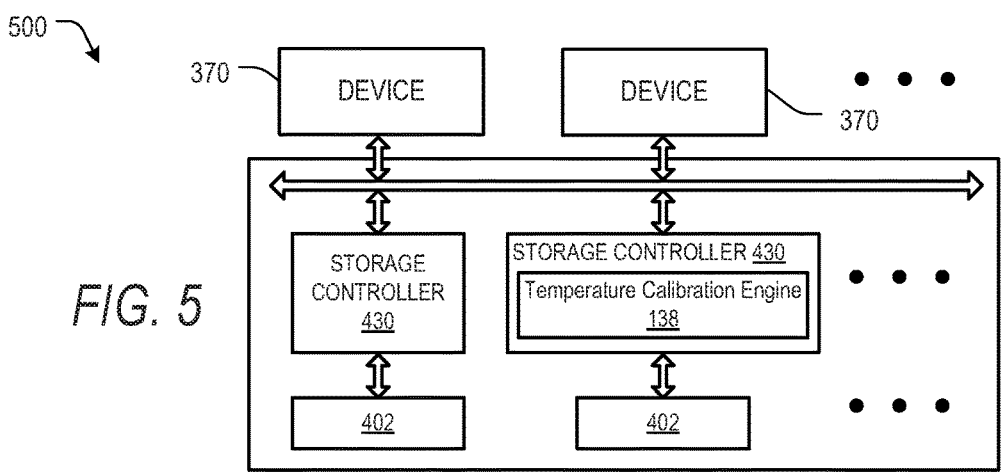
FIG. 5 is a block diagram of a particular illustrative embodiment of a hierarchical storage system that includes a plurality of the storage systems of FIG. 4.

FIG. 5 is a block diagram illustrating a hierarchical storage system 500. The hierarchical storage system 500 includes a plurality of storage controllers 430, each of which controls a respective storage system 402. Devices 370 (e.g., one or more host devices or accessing devices) may access memories within the hierarchical storage system 500 via a bus interface. In one embodiment, the bus interface may be an NVMe or fiber channel over Ethernet (FCoE) interface. In one embodiment, the hierarchical storage system 500 illustrated in FIG. 5 may be a rack mountable mass storage system that is accessible by multiple host computers, such as would be found in a data center or other location where mass storage is needed. One or more storage controllers 430 of FIG. 5 may include the temperature calibration engine 138.

Figure 6:
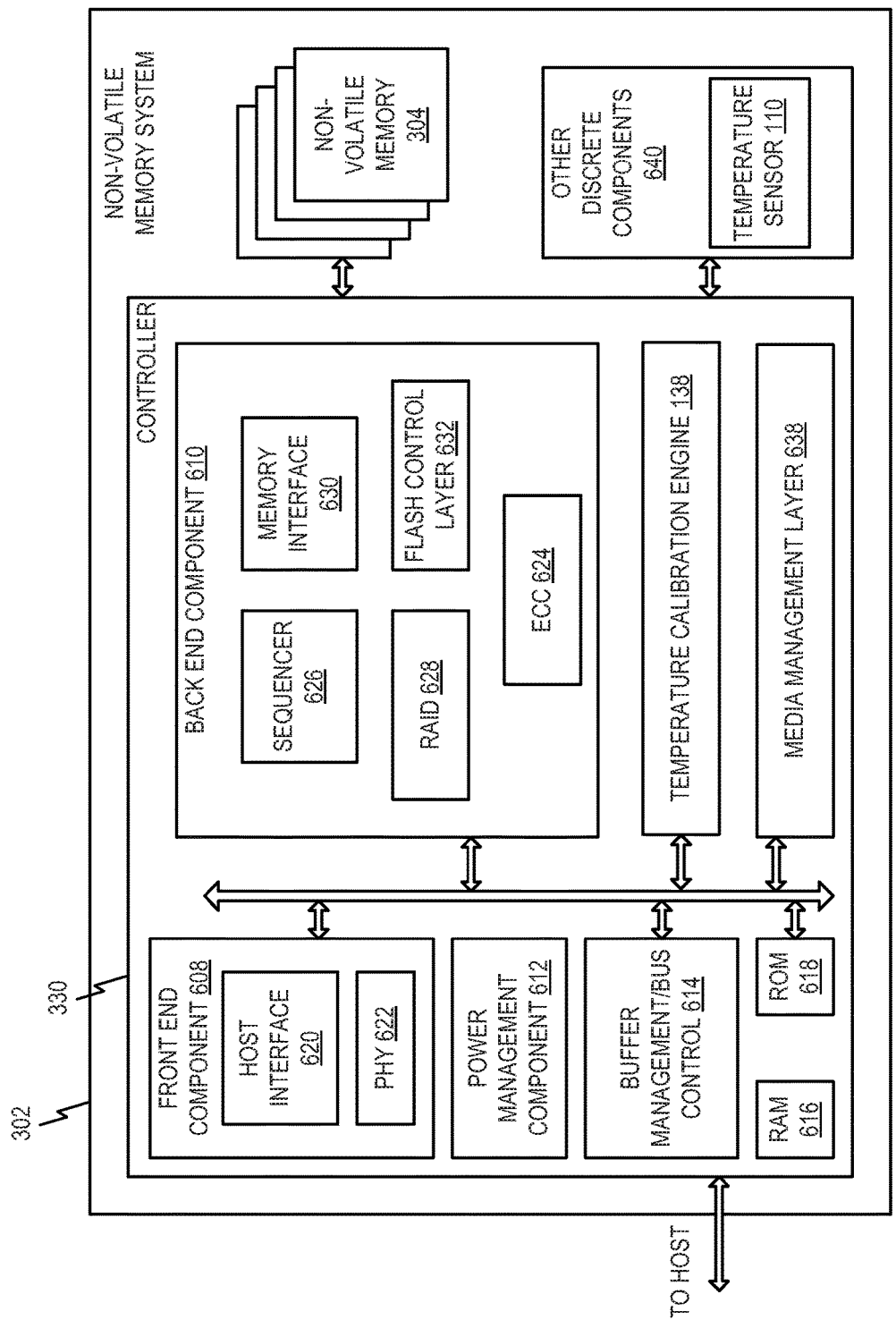
FIG. 6 is a block diagram of a memory system and depicts components of a particular illustrative embodiment of a controller of the non-volatile memory system of FIG. 3.

FIG. 6 is a block diagram illustrating exemplary components of the controller 330 of the non-volatile memory system 302 in more detail. The controller 330 may include the temperature calibration engine 138. The controller 330 also includes a front end component 608 that interfaces with a host device, a back end component 610 that interfaces with the one or more non-volatile memory dies 304, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to the controller 330, a buffer manager/bus controller 614 manages buffers in random access memory (RAM) 616 and controls the internal bus arbitration of the controller 330. A read only memory (ROM) 618 stores system boot code. Although illustrated in FIG. 6 as located within the controller 330, in other embodiments one or both of the RAM 616 and the ROM 618 may be located externally to the controller 330. In yet other embodiments, portions of RAM and ROM may be located both within the controller 330 and outside the controller 330.

Front end component 608 includes a host interface 620 and a physical layer interface (PHY) 622 that provide the electrical interface with the host device or next level storage controller. The choice of the type of host interface 620 can depend on the type of memory being used. Examples of host interfaces 620 include, but are not limited to, SATA, SATA Express, SAS, Fibre Channel, USB, PCIe, and NVMe. The host interface 620 typically facilitates transfer for data, control signals, and timing signals.

Back end component 610 includes an error correcting code (ECC) engine 624 that encodes the data received from the host device, and decodes and error corrects the data read from the non-volatile memory, such as the data 106. A command sequencer 626 generates command sequences, such as program and erase command sequences, to be transmitted to the one or more non-volatile memory dies 304. A RAID (Redundant Array of Independent Drives) component 628 manages generation of RAID parity and recovery of failed data. The RAID parity may be used as an additional level of integrity protection for the data being written into the one or more non-volatile memory dies 304. In some cases, the RAID component 628 may be a part of the ECC engine 624. A memory interface 630 provides the command sequences to non-volatile memory die 304 and receives status information from the one or more non-volatile memory dies 304. For example, the memory interface 630 may be a double data rate (DDR) interface, such as a Toggle Mode 200, 400, or 800 interface. A flash control layer 632 controls the overall operation of back end component 610.

Additional components of the non-volatile memory system 302 illustrated in FIG. 6 include a power management component 612 and a media management layer 638, which performs wear leveling of memory cells of the one or more non-volatile memory dies 304. The non-volatile memory system 302 may also include one or more other components or features illustrated with reference to FIG. 1, such as the temperature calibration engine 138, as an illustrative example. Non-volatile memory system 302 also includes other discrete components 640, such as external electrical interfaces, external RAM, resistors, capacitors, or other components that may interface with the controller 330. In alternative embodiments, one or more of the physical layer interface 622, RAID component 628, media management layer 638 and buffer management/bus controller 614 are optional components that are omitted from the controller 330.

Figure 7:
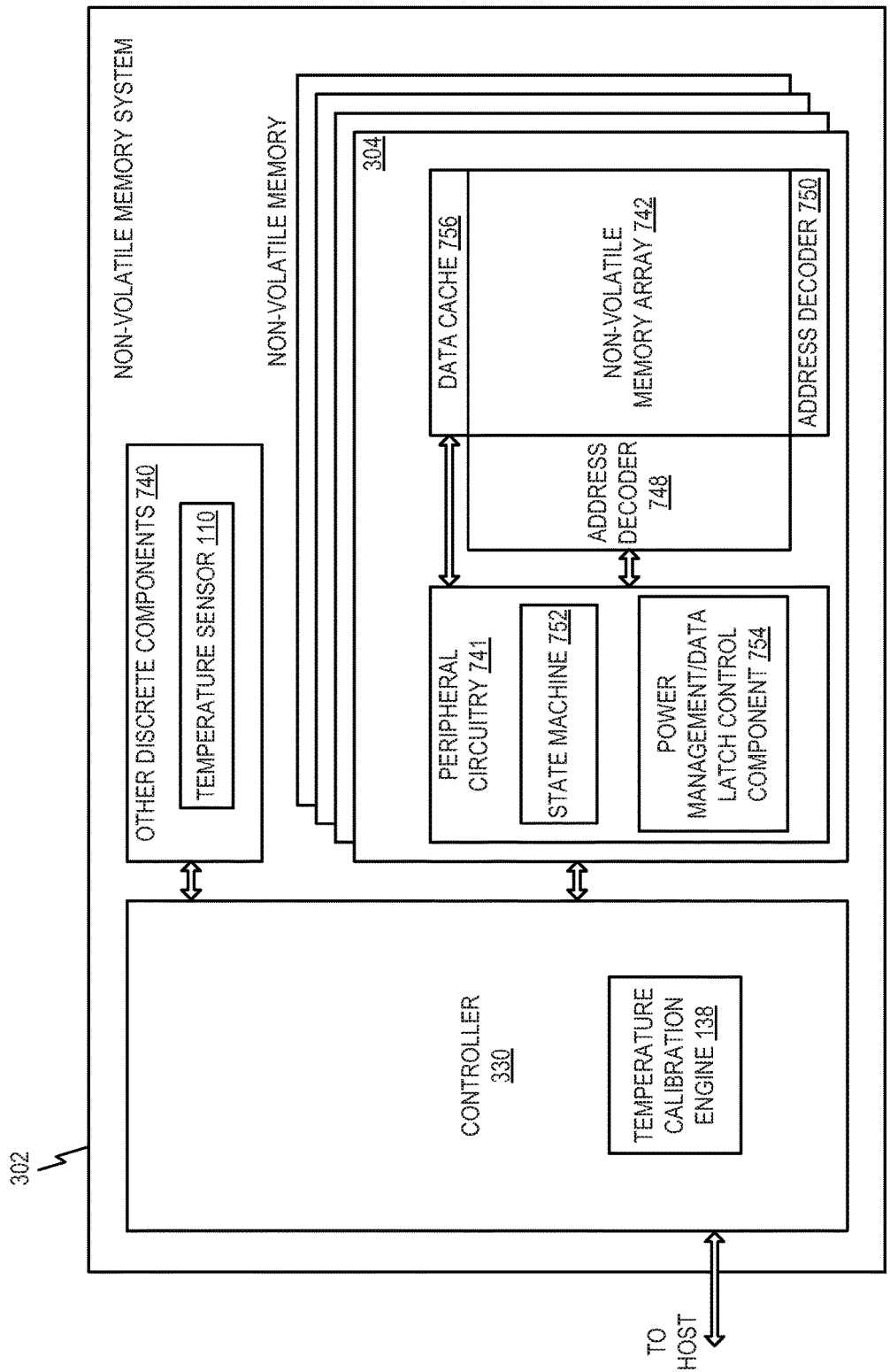
FIG. 7 is a block diagram of a memory system and depicts components of a particular illustrative embodiment of a non-volatile memory die of the non-volatile memory system of FIG. 3.

FIG. 7 is a block diagram illustrating exemplary components of the one or more non-volatile memory dies 304 of the non-volatile memory system 302 in more detail. The one or more non-volatile memory dies 304 include peripheral circuitry 741 and a non-volatile memory array 742. The non-volatile memory array 742 includes the non-volatile memory cells used to store data. The non-volatile memory cells may be any suitable non-volatile memory cells, including NAND flash memory cells and/or NOR flash memory cells in a two dimensional and/or three dimensional configuration. The peripheral circuitry 741 includes a state machine 752 that provides status information to the controller 330. The peripheral circuitry 741 may also include a power management or data latch control component 754. The one or more non-volatile memory dies 304 further include discrete components 740, an address decoder 748, an address decoder 750, and a data cache 756 that caches data. FIG. 7 also illustrates that the controller 330 may include the temperature calibration engine 138.

In connection with the above-described embodiments, an apparatus (e.g., the data storage device 102) includes means (e.g., the memory 104) for storing data (e.g., the data 106). The apparatus further includes means (e.g., the temperature sensor 110) for sensing a temperature associated with the means for storing data. The apparatus also includes means (e.g., the temperature calibration engine 138) for initiating memory operations at storage elements of the means for storing data, for determining a temperature metric (e.g., the first temperature metric 136*a* or the nth temperature metric 136*n*) based on temperature readings (e.g., any of the temperature data 112*a*-112*f*) generated by the means for sensing in response to initiation of the memory operations, and for modifying a temperature threshold (e.g., any of the thresholds 140*a*, 140*n*, 142*a*, or 142*n*) based on the temperature metric.

Although various components depicted herein are illustrated as block components and described in general terms, such components may include one or more microprocessors, state machines, or other circuits configured to enable such components to perform one or more operations described herein. For example, the temperature calibration engine 138 may represent physical components, such as hardware controllers, state machines, logic circuits, or other structures, to enable the controller 130 to perform temperature calibration operations.

Alternatively or in addition, the temperature calibration engine 138 may be implemented using a microprocessor or microcontroller programmed to perform a hash operation. In a particular embodiment, the temperature calibration engine 138 includes a processor executing instructions (e.g., firmware) that are stored at the memory 104. Alternatively, or in addition, executable instructions that are executed by the processor may be stored at a separate memory location that is not part of the memory 104, such as at a read-only memory (ROM).

It should be appreciated that one or more operations described herein as being performed by the controller 130 may be performed at the memory device 103. As an illustrative example, one or more operations described with reference to the temperature calibration engine 138 may be performed at the memory device 103 alternatively or in addition to performing such operations at the controller 130. To further illustrate, initiation of one or more memory operations corresponding to the one or more memory commands 120, determination of one or more temperature metrics (e.g., the temperature metrics 136*a* and 136*n*), and determination of one or more temperature thresholds (e.g., the thresholds 140*a*, 140*n*, 142*a*, and 142*n*) may be performed at the memory device 103 in certain implementations.

The data storage device 102 may be coupled to, attached to, or embedded within one or more accessing devices, such as within a housing of the device 170. For example, the data storage device 102 may be embedded within the device 170 in accordance with a Joint Electron Devices Engineering Council (JEDEC) Solid State Technology Association Universal Flash Storage (UFS) configuration. To further illustrate, the data storage device 102 may be integrated within an electronic device (e.g., the device 170), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 may be implemented in a portable device configured to be selectively coupled to one or more external devices, such as a host device. For example, the data storage device 102 may be removable from the device 170 (i.e., "removably" coupled to the device 170). As an example, the data storage device 102 may be removably coupled to the device 170 in accordance with a removable universal serial bus (USB) configuration.

The device 170 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The device 170 may communicate via a controller, which may enable the device 170 to communicate with the data storage device 102. The device 170 may operate in compliance with a JEDEC Solid State Technology Association industry specification, such as an embedded MultiMedia Card (eMMC) specification or a Universal Flash Storage (UFS) Host Controller Interface specification. The device 170 may operate in compliance with one or more other specifications, such as a Secure Digital (SD) Host Controller specification as an illustrative example. Alternatively, the device 170 may communicate with the data storage device 102 in accordance with another communication protocol. In some implementations, the data storage device 102 may be integrated within a network-accessible data storage system, such as an enterprise data system, an NAS system, or a cloud data storage system, as illustrative examples.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the device 170 via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to the device 170 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The memory 104 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. In a particular embodiment, the data storage device 102 is indirectly coupled to an accessing device (e.g., the device 170) via a network. For example, the data storage device 102 may be a network-attached storage (NAS) device or a component (e.g., a solid-state drive (SSD) component) of a data center storage system, an enterprise storage system, or a storage area network. The memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
a non-volatile memory including storage elements;
a temperature sensor; and
temperature calibration circuitry coupled to the temperature sensor and configured to:
  perform a first thermal calibration based on a first set of memory operations to determine a temperature metric based on temperature readings that are generated by the temperature sensor in response to the first set of memory operations and implement a set of temperature thresholds based on the first temperature metric, and
  perform a second thermal calibration based on a second set of memory operations to determine a different temperature metric based on second temperature readings that are generated by the temperature sensor in response to the second set of memory operations and implement a different set of temperature thresholds based on the different temperature metric.

2. The data storage device of claim 1, further comprising a host interface coupled to the temperature calibration circuitry and configured to communicate with a host device, wherein the temperature calibration circuitry is configured to initiate one of the first memory operations and the second memory operations in response to detecting a coupling event that couples the host interface is coupled to the host device.

3. The data storage device of claim 2, wherein the temperature calibration circuitry is configured to initiate another of the first memory operations and the second memory operations in response to detecting one of a power-up event by the power-up detector and a time interval that is associated with thermal calibration event.

4. The data storage device of claim 1, further comprising a power-up detector coupled to the temperature calibration circuitry, wherein the temperature calibration circuitry is configured to initiate one of the first memory operations and the second memory operations in response to detection of a power-up event by the power-up detector.

5. The data storage device of claim 4, wherein the temperature calibration circuitry is configured to initiate another of the first memory operations and the second memory operations in response to detecting one of a time interval that is associated with thermal calibration event and a coupling event that couples a host interface to a host device.

6. The data storage device of claim 1, wherein the temperature calibration circuitry is further configured to initiate one of the first memory operations and the second memory operations during a time interval that is associated with a thermal calibration event.

7. The data storage device of claim 6, wherein the temperature calibration circuitry is configured to initiate another of the first memory operations and the second memory operations in response to detecting one of a power-up event by the power-up detector and a coupling event that couples a host interface to a host device.

8. The data storage device of claim 1, wherein the temperature calibration circuitry is further configured to initiate a first throttling mode in response to a first temperature detected by the temperature sensor satisfying a first temperature threshold in one of the first set of temperature thresholds and the second set of temperature thresholds.

9. The data storage device of claim 8, wherein initiating the first throttling mode includes one of:
  reducing a data throughput associated with memory access operations to the non-volatile memory;
  performing memory access operations to sequential physical addresses of the non-volatile memory to concentrate heat to a particular area of the non-volatile memory; and
  performing parallel memory access operations on storage elements in different locations.

10. The data storage device of claim 8, wherein the temperature calibration circuitry is further configured to initiate a second throttling mode in response to a second temperature detected by the temperature sensor satisfying a second temperature threshold in one of the first set of temperature thresholds and the second set of temperature thresholds.

11. The data storage device of claim 1, wherein one of the first temperature metric and the second temperature metric indicates a temperature rise detected at the non-volatile memory by the temperature sensor during execution of a respective one of the first calibration memory operations and the second calibration memory operations.

12. A method of operation of a data storage device that includes a non-volatile memory and a temperature sensor, the data storage device storing a first set of temperature thresholds associated with the data storage device and implemented in response to a first thermal calibration, the method comprising:
  detecting a trigger event;
  performing a second thermal calibration on the non-volatile memory in response to the trigger event to receive temperature data from the temperature sensor; and
  implementing a second set of temperature thresholds for the data storage device in response to the second thermal calibration.

13. The method of claim 12, further comprising overwriting the first temperature threshold with the second temperature threshold.

14. The method of claim 12, wherein the first temperature threshold is based on a first operating environment of the data storage device, and wherein the second temperature threshold is based on a second operating environment of the data storage device.

15. The method of claim 14, wherein the first operating environment corresponds to one of a production stage of the data storage device, a production stage of a host device that includes the data storage device, an initialization stage of the host device, or an end user stage of the data storage device.

16. The method of claim 15, wherein the second operating environment corresponds to another of the production stage of the data storage device, the production stage of the host device, the initialization stage of the host device, or the end user stage of the data storage device.

17. The method of claim 12, wherein the first temperature threshold is determined based on a workload process, and further comprising performing the workload process while the temperature data is generated.

18. The method of claim 17, wherein the workload process comprises sequential write operations performed on the non-volatile memory.

19. The method of claim 12, further comprising sending one or more measurement commands to the temperature sensor to cause the temperature sensor to generate the temperature data.

20. The method of claim 19, wherein the one or more measurement commands are sent to the temperature sensor in response to detecting the trigger event.

21. The method of claim 20, wherein detecting the trigger event includes one or more of detecting a host device coupled to the data storage device, detecting a power-up event at the data storage device, or detecting that a particular time interval has elapsed since determination of the first temperature threshold.

22. The method of claim 12, further comprising initiating a first throttling mode of operation to reduce a data throughput associated with memory access operations to the non-volatile memory by slowing a rate of the memory access operations in response to a first temperature detected by the temperature sensor that satisfies a first temperature threshold in one of the first set of temperature thresholds and the second set of temperature thresholds.

23. The method of claim 22, further comprising initiating a second throttling mode in response to a second temperature detected by the temperature sensor that satisfies a second temperature threshold in one of the first set of temperature thresholds and the second set of temperature thresholds.

24. An apparatus comprising:
  means for storing a first set of temperature thresholds for a data storage device and implemented in response to a first thermal calibration at a first time;
  means for detecting a trigger event at a second time; and
  means for implementing a second set of temperature thresholds for the data storage device in response to detecting the trigger event.

25. The apparatus of claim 24, wherein:
  the means for storing includes a non-volatile memory;
  the means for detecting includes a controller; and
  the means for implementing includes a temperature calibration engine.

* * * * *